United States Patent [19]

Moore

[11] 3,782,267

[45] Jan. 1, 1974

[54] APPARATUS FOR PRESSURE COOKING FOOD

[76] Inventor: George A. Moore, 843 N. Dellrose, Wichita, Kans. 67208

[22] Filed: Feb. 2, 1971

[21] Appl. No.: 111,936

Related U.S. Application Data

[62] Division of Ser. No. 608,168, Jan. 9, 1967.

[52] U.S. Cl. .................................. 99/410, 21/100
[51] Int. Cl. ............................................. A47j 37/12
[58] Field of Search.................... 99/410, 411, 412, 99/413, 414, 415, 416, 417, 418, 409, 408, 407, 404, 403, 324, 336, 345, 346, 347, 450, 339, 340, 329, 319; 126/20.1, 377; 21/100, 99, 95; 134/135

[56] References Cited
UNITED STATES PATENTS

| | | | |
|---|---|---|---|
| 545,936 | 9/1895 | Bentall | 99/322 |
| 3,501,316 | 3/1970 | Guthrie, Sr. | 99/336 X |
| 2,244,145 | 6/1941 | Erickson | 99/410 X |
| 1,393,762 | 10/1921 | Demuth | 99/347 |
| 1,467,141 | 9/1923 | Demuth | 126/377 |
| 2,548,325 | 4/1951 | Smith | 99/347 |
| 2,397,410 | 3/1946 | Deacon | 99/450 X |
| 1,318,246 | 10/1919 | Underwood | 21/100 |
| 2,566,914 | 9/1951 | Worst | 99/319 UX |
| 3,431,834 | 3/1969 | Keathley et al. | 99/336 |
| 2,546,464 | 3/1951 | Martin | 99/336 |

Primary Examiner—Leon G. Machlin
Attorney—Robert E. Breidenthal

[57] ABSTRACT

Deep-fat pressure cooker apparatus including a power driven cover that coacts with the cooking vessel in the manner of a piston and a cylinder to enable both the closure of the vessel and also the compression of the contents of the vessel to pressurize the latter. The apparatus also includes a food basket that is releasably coupled to depend from the cover, and which basket, if previously positioned in the vessel, is automatically coupled to the cover on the subsequent lowering of the latter.

22 Claims, 8 Drawing Figures

PATENTED JAN 1 1974

INVENTOR.
GEORGE A. MOORE
BY
Robert E Breidenthal
ATTORNEY

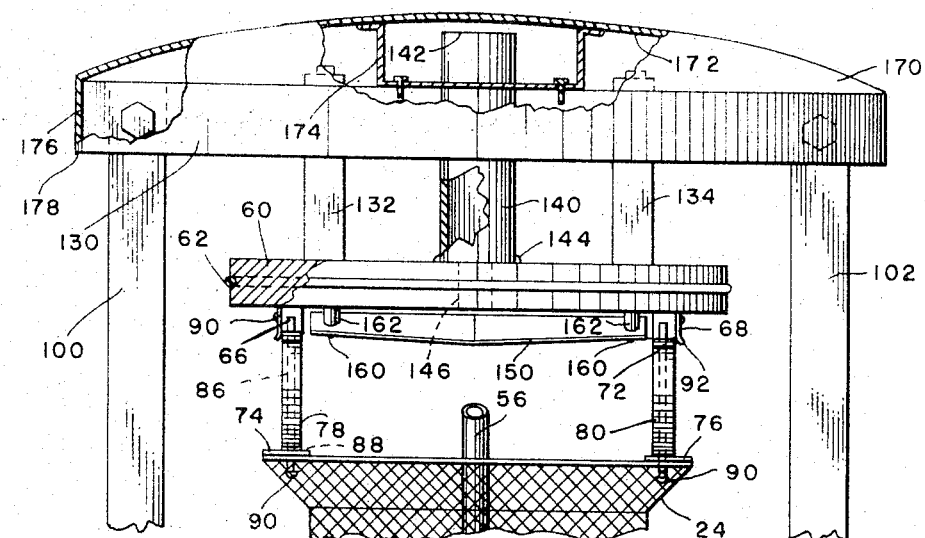
FIG. 5
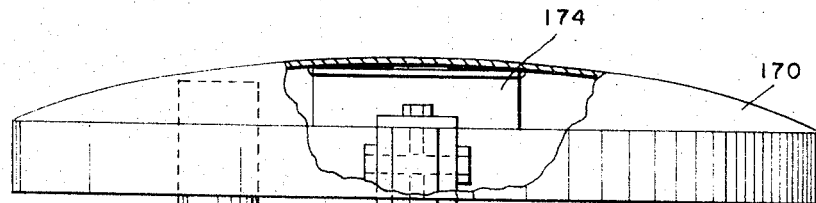
FIG. 6
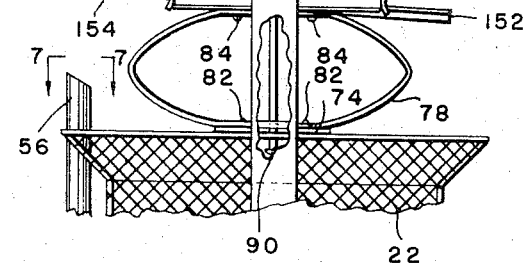
FIG. 7
FIG. 8
INVENTOR.
GEORGE A. MOORE
BY
Robert E. Bierdenthal
ATTORNEY

APPARATUS FOR PRESSURE COOKING FOOD

This is a division of U.S. Application Ser. No. 608,168, filed Jan. 9, 1967, entitled Apparatus For and Method of Pressure Cooking Foods.

The present invention is related to and constitutes an improvement over my invention disclosed in my abandoned application Ser. No. 480,998, entitled Apparatus and Method for Pressure Cooking Foods that was filed Aug. 19, 1965 and my pending continuation application thereof which was filed Jan. 9, 1967. The disclosure of the abandoned application and the pending continuation application is incorporated herein by reference.

This invention relates to new and useful improvements in apparatus generally useful for immersion treatment of articles and especially in the pressure cooking of foods, and in view of such especially important field of utilization, the invention as herein disclosed more particularly pertains to apparatus of such character especially well suited for such use wherein the articles of food are carried by a basket that is in turn suspended from the closure of the pressure cooking vessel, and wherein special provision is made for detachable coupling or suspension of the basket from the closure, and wherein special provisions are made with respect to the venting of vapor from the cooking vessel and for pressurizing such vessel.

It is an object of this invention to provide a means whereby a food carrying basket can be readily caused to be suspended from or removed from suspension from the vertically movable closure of the cooking vessel when the closure is raised to a position spaced sufficiently above the top of the cooking vessel.

Another very important object of the present invention is to provide means whereby the food carrying basket can be disposed entirely within the cooking vessel and the closure thereafter detachably coupled thereto upon moving the closure from its open to its vessel closing position.

Yet another important object of the invention is to provide apparatus of the character defined above wherein yielding means is provided intermediate the closure and the basket such as to prevent or greatly lessen the likelihood of destructive forces being generated upon forcible downward movement of the closure to its vessel closing position when some object may have become interposed between the bottom of the basket and the bottom of the vessel.

Still another object of the invention to be specifically set forth is to provide apparatus for the pressure cooking of foods wherein vapor can be readily vented from the vessel even when the closure is closely spaced to the liquid surface, and to accomplish such venting in such a manner as to minimize the entrainment of liquid droplets with vapor being vented from the vessel.

A broad aspect of the invention involves, in apparatus for immersion treatment of articles, structure comprising an upright, open-topped container adapted to contain a liquid, perforate article carrying means removably received within said container whereby articles carried by said means can be immersed within the container, means for withdrawing said article carrying means from the container comprising a withdrawal member mounted for vertical movement relative to the container along a path above the article carrying means, said article carrying means and the withdrawal member being provided with coacting means responsive to downward closing movement of the withdrawal member to a predetermined position relative to the article carrying means to detachably secure the withdrawal member to the article carrying means whereby the latter means can be supported and raised from within the container on upward movement of the withdrawal member, and means for raising the withdrawal member whereby the article carrying means can be removed from the container.

Another important aspect of the invention involves the coacting means of the preceding paragraph being of magnetic character.

A somewhat more limited aspect of the invention involves apparatus of the character specified in the last two paragraphs, wherein the coacting means is of magnetic character and includes separable portions mounted on the article carrying means and the withdrawal member, such portions being magnetically attracted to each other in a vertical direction, said portions having engageable mating surfaces with said surfaces being in sliding engagement in a horizontal direction, whereby said magnetic attraction and the magnetic coupling of the two portions can be broken by slidingly moving one of the portions horizontally relative to the other. A more restricted aspect involves one of such portions being mounted by spring means, thereby to afford a yielding connection as between the article carrying means and the withdrawal member.

Still another broad aspect of the invention involves, in the combination of a vessel adapted to contain a liquid with vapor space thereabove and a vertically movable closure for the vessel that is movable between positions that open and close the vessel, said vessel having a vapor vent pipe for venting vapor from the vessel, the improvement therein comprising said closure having an upstanding vapor dome of horizontal internal dimensions substantially less than those of the vessel, and said vent pipe having an inlet end portion that is upstanding and which is received within the dome when the closure closes the vessel.

Related to the aspect of the invention set forth in the preceding paragraph is the provision of baffle means disposed below and carried by the closure defining a tortuous vapor path from below such means to the vapor dome, whereby liquid entrained by vapor largely collects on and may drain from such baffle means.

Yet another important aspect of the invention to be specifically enumerated involves, in apparatus for the pressure cooking of foods of the type wherein a food carrying basket is suspended from a vertically movable closure for movement into and out of a cooking vessel on the closure being moved to its vessel closing position and raised open position, respectively, the improvement comprising said basket being suspended from said closure by means of a vertically yieldable spring means, whereby forcible closure of the vessel does not result in destructive forces upon a foreign object becoming interposed between the basket and the bottom of the vessel.

An important feature of the invention resides in the provision of coacting magnetic means for detachably suspending the basket from the closure, and particularly in that such provision includes a pair of looplike spring members at diametrically opposed positions at the upper end of the basket such as to constitute handles for manually carrying the basket.

Yet another important feature of the invention resides in the basket being recessed vertially along one side thereof to accommodate the vertically extending portion of the vent pipe, whereby optimum space utilization of the interior of the vessel is obtained, and whereby the angular position of the basket about its vertical axis is held to such a value as to assure proper registry of the coacting magnetic means when the basket is to be coupled to the closure after the basket is already within the vessel.

Still another important feature of the invention resides in the closure being provided with an upstanding vapor dome such as to accept therein the upper or inlet open end of the vent pipe when the closure is lowered, thereby spacing the inlet end of the vent pipe a substantial distance above the liquid even when the closure is closely spaced to the liquid, and thereby to minimize the entrainment of liquid droplets with vapor entering the vent pipe.

The provision of baffle means disposed below the closure and the vapor dome to minimize entrained liquid droplets and mists being carried up into the vapor dome and to constitute a collection or coalescing surface from which coalesced liquid may drain is deemed an important feature of the invention in that loss of cooking oil with vapor vented from the dome is substantially curtailed or essentially eliminated entirely.

These, together with other objects, aspects, features, and advantages of the present invention, will become evident during the ensuing description of a preferred embodiment of the invention, such description to be taken in conjunction with the accompanying drawings illustrative of such preferred embodiment, wherein:

FIGS. 5 and 6 are enlarged fragmentary views of the upper positions of the showings in FIGS. 1 and 2, respectively, parts being broken away and shown in section and hidden details being shown in broken lines to illustrate to better advantage structural features of the invention;

Figure 1:
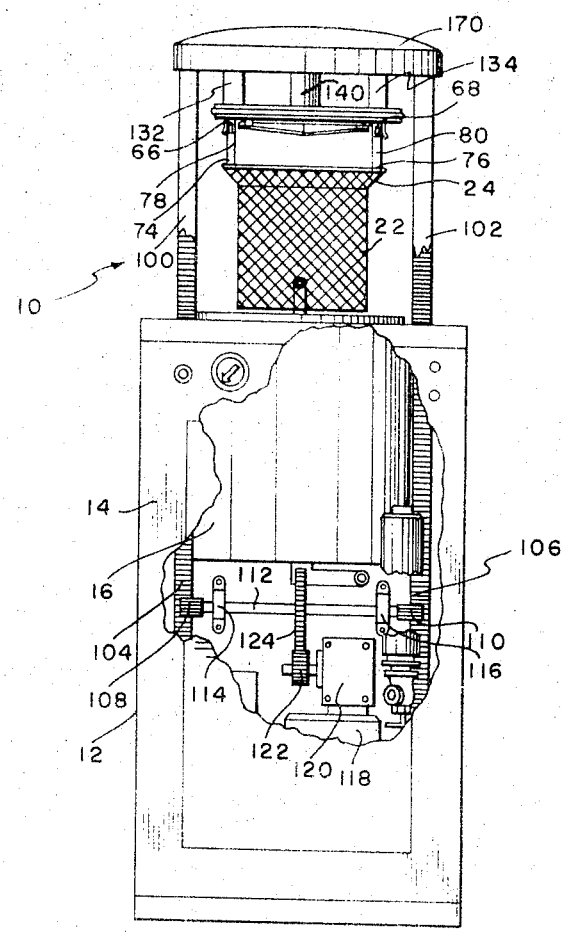
FIG. 1 is a front elevational view of the apparatus of this invention, this view showing the withdrawal or closure in raised or open position, and showing the article carrying means or basket supported thereby; portions of the front wall of the cabinet or console being broken away to expose hidden equipment components.

FIG. 7 is a fragmentary top plan view on an enlarged scale taken from the plane of the line 7—7 in FIG. 6 to illustrate structural features of and spatial relationships of the vessel, heating elements, the liner, the basket and the vent pipe; and, FIG. 8 is a fragmentary perspective view of one of the coacting magnetic means in magnetically coupled relationship, such means being shown apart from other structure.

Referring now to the accompanying drawings, wherein like numerals designate like parts throughout the various views, the reference numeral 10 designates generally the automatic deep-fat pressure cooker apparatus of this invention, such apparatus 10 corresponding in all material respects to the apparatus disclosed in my previously mentioned abandoned application Ser. No. 480,998 and its continuation except as hereinafter specifically described, and reference is made to such applications for a detailed disclosure of the electrical controls, manual controls, and instrumentation of the apparatus 10. Detailed illustration and/or detailed description of such apparatus disclosed in such applications as well as a description of the methods disclosed in such applications would herein be superfluous and tend to obscure novelty in apparatus and method herein disclosed. Furthermore, as will become evident, those possessing a nominal skill in the art to which this invention pertains will be capable of obtaining a full and complete understanding of the inventive subject matter hereinafter claimed solely from consideration of this specification taken in conjunction with the accompanying drawings.

The apparatus 10 comprises an upstanding cabinet or enclosure 12 having a front wall 14 constituting a console or instrument panel upon which are displayed and exposed for use various warning and signaling lights, indicating instruments whereby the operator can be apprised of such matters as operating temperature and pressure, and various controls exposed for manipulation by the operator in the customary manner, as designated generally in FIG. 1 by the reference numeral 15.

An open top, generally cylindrical pressure vessel 16 is disposed within the cabinet 12, and is arranged to have the open upper end 18 thereof projecting slightly above the top 20 of the cabinet 12, it being understood that means, not shown, maintain the vessel 16 in the cabinet 12 in fixed relationship to each other.

Means is provided for supporting food articles within the vessel 16 in such a manner that such food articles, as for example, pieces of cut chicken which may be coated by a suitable batter or conventional breading material, may be immersed in a suitable cooking oil or fluid partially filling the vessel 16. Such means comprises a generally cylindrical metallic basket 22 having an upwardly and outwardly flared upper rim 24. The basket 22 is open at its upper end and closed at its lower end, and is of an open construction, that is, a highly perforate character, and can be fabricated of expanded metallic sheet or of welded wire construction. Preferably the basket 22, whether formed of expanded metal or welded wire, is made of steel that is in turn heavily electroplated with metallic nickel or is made of stainless steel. Such preference is based upon the fact that it is essential that the basket 22 not be of such character as to contaminate food so as to either create a health hazard or to impart any unpleasant odor or taste to the food or the cooking fluid, and by the desirability of the basket 22 having a surface such as to be easily cleaned and not suffer any discoloration displeasing to the eye. It is, of course, not essential that the basket 22 have surfaces of only either nickel or stainless steel, and it is feasible that the basket 22 have a surface coating of polytetrafluoroethylene.

When disposed within the vessel 16, the basket 22 rests upon and is constrained to a position substantially concentric with the vessel 16 by a liner 26. The liner 26 (see FIGS. 2 and 7) is removably disposed within the vessel or container 16 and is comprised of a vertically spaced series of metallic rings or wires such as those indicated at 28 that are joined by a cylindrical array of vertically extending metallic rods such as those indicated at 30 that are welded thereto. The rods 30 are disposed within the vertically spaced rings 28, and the lower ends of such vertical rods 30 may rest upon the bottom 32 of the vessel 16 so as to support the liner 26. It will be understood that the radial spacing of the vertical rods 30 from the central vertical axis of the liner 26 is in excess of the radius of the cylindrical portion of the basket 22, whereby the basket 22 can be readily received within the liner 26. The upper end portions of the rods 30 are upwardly and outwardly flared as indicated at 34, and the upper free ends of the rods 30 are welded to the inner side of a metallic ring 36, such ring 36 having an outer diameter slightly less than the internal diameter of the vessel or pot 16. As clearly apparent on inspection of FIG. 2, the outer diameter of the rings 28 is substantially less than the diameter of the vessel 16 so as to afford sufficient space between the liner 26 and the inner wall of the vessel 16 for electrical heating elements such as those shown at 40, 42 and 44. In addition, such spacing of the rings 30 from the inner wall of the vessel 16, as assured by the greater diameter of the ring 36, is sufficient to accommodate a vertically extending vent pipe 46. The vertically extending vent pipe 46 is sufficiently spaced from the inner wall surface of the vessel 16 to accommodate heating elements such as the one indicated at 40 therebetween, and also such as to accommodate the ring 36 therebetween.

The portion of the liner 26 defined by the upwardly and outwardly flaring free end portions 34 of the rods 30 constitutes an inclined shoulder for supporting the basket 22 by virtue of the upwardly and outwardly flaring rim 24 being adapted to rest upon the portions 34 of the rods 30. It is to be especially noted on inspection of FIG. 7 that the upwardly and outwardly flaring rim 24 of the basket 22 is cut away as indicated at 50 to accommodate the vent pipe 46 with adequate working clearance during raising or lowering of the basket 22 in the vessel 16. It is to be noted that the upwardly and outwardly inclined portions 34 of the rods 30 serve to guide the basket into concentric relationship with the vessel 16 on lowering of the basket 22 into the vessel 16 and the liner 26.

The lower end portion of the vent pipe 46 communicates in a sealed manner (as indicated at 52) with a vent pipe 54, that is in turn connected by means not shown with valve means to control venting from the vessel 16. It will be appreciated that the vent pipe 54 and its connection to automatic valve control means may be such as disclosed in relation to the vent pipe provided in the apparatus disclosed in my previously mentioned applications.

The upper end of the vent pipe includes a portion 56 that projects above the open upper end 18 of the vessel 16 for a purpose presently to be explained. It will, however, be appreciated at this stage of the description of the apparatus that the arrangement is such that the liner 26 can be readily raised from the position shown thereof in FIG. 2 and removed for cleaning, which will of course afford ready access for cleaning the bottom 32 of the vessel 16 or to enable repair or replacement of the heating elements. Also, the arrangement is such that the basket 22 can be readily moved into and from the liner 26 when the latter is in the vessel 16. In the preferred construction, the vertical height of the basket 22 is such that the bottom thereof is spaced somewhat above the bottom 32 of the vessel 16 when the basket 22 is supported upon the liner 26.

A combined means is provided for withdrawing the basket 22 from its cooking position resting upon the liner 26 within the vessel 16 and for closing the vesssl 16. Such means comprises a generally circular withdrawal member or closure 60 of a disc-like configuration, such withdrawal member 60 which may conveniently also be termed a pressure plate is provided with a peripheral annular groove in which is seated a sealing ring 62 preferably made of silicone rubber. The pressure plate 60 and its seal ring 62 are so dimensioned with respect to the circular cylindrical inner surface of the vessel or pot 16 as to effectively constitute a piston and cylinder arrangement in that the pressure plate 60 and its seal ring 62 can be forced downwardly into the open top 18 of the vessel 16 so as not only to close the vessel 16 to define therein a confined cooking zone or volume, but also to enable upon further downward movement of the pressure plate 60 the compression of contents of such volume by virtue of reducing the volume of the confined cooking zone. This is of course true whenever all available space in the confined zone is fluid filled, whether such fluids are liquid or vapor, though it is to be understood that in the use of the embodiment of the invention illustrated and described the confined cooking zone will be filled insofar as not precluded by solid matter with fluids and that a portion of such filled volume will be vapor filled.

In order that the basket 22 may be detachably supported from the withdrawal member or pressure plate 60, coacting magnetic means is provided for magnetically coupling the basket 22 to the withdrawal member 60, such coacting magnetic means preferably taking the form of a pair of elongated, channel shaped permanent magnets 66 and 68 being secured to the under side of the withdrawal member 60. The magnets 66 and 68 are of high strength and of a permanent type and are disposed in parallelism to each other at diametrically opposed positions with respect to the center of the pressure plate 60. The magnets 66 and 68 are arranged to coact respectively with correspondingly elongated, horizontal paramagnetic members 70 and 72 that are operatively connected at diametrically opposed positions to the rim 24 of the basket 22. Such diametrically opposed positions about the rim 24 of the basket 22 are at right angles with respect to the direction that the cutout portion 50 bears from the center of the basket 22. The paramagnetic members 70 and 72 have the same width as the magnets 66 and 68 and are in parallelism to each other, and are respectively spaced above metallic mounting brackets 74 and 76 secured as by welding or the like to the rim 24. Leaf springs 78 and 80 of elliptical configuration are provided respectively to connect the members 70 and 72 to the brackets 74 and 76. The lower central portion of the elliptical metallic springs 78 and 80 are fixedly secured to the brackets 74 and 76 by rivets such as the rivets indicated at 82 in FIG. 6 in relation to the elliptical spring 78. In a similar fashion the upper central portion of the elliptical springs 78 and 80 are fixedly secured to the central portions of the paramagnetic members 70 and 72 by rivets such as those shown at 84 in FIG. 6 in relation to the elliptical spring 78. It should be noted at this point that the elliptical springs 78 and 80 define open loops which in connection with the paramagnetic members 70 and 72 attached thereto constitute handles by means of which the basket 22 can be manually lifted.

Means is provided to limit upward movement of the paramagnetic members 70 and 72 from the brackets 74 and 76 over which they are respectively disposed. Such means are identical for each of the paramagnetic members 70 and 72, and as clearly shown in FIGS. 5 and 6 in relation to the paramagnetic member 70, such means comprises a metallic rod 86 having its upper end fixedly secured to the center of the paramagnetic member 70 and depending therefrom vertically to slidably extend through an opening 88 in the bracket 74. The lower end of the rod 86 is provided with an enlarged head 89 which is engageable with the underside of the bracket 74 about the opening 88 to limit upward movement of the paramagnetic member 70. In the preferred construction, the elliptical springs 78 and 80 have a position of repose such that the upper central portions thereof would be higher than the positions to which they are limited by the rods 86, that is, the elliptical springs 78 and 80 are installed so as to be biased yieldingly against the limiting means constituted of the rods 86.

For reasons subsequently to be explained in greater detail, means is provided to prevent magnetic coupling of the member 70 with the magnet 66 concurrently with magnetic coupling of the member 72 with the magnet 68, and vice versa, unless both of the members 70 and 72 are with respect to their transverse horizontal dimensions in substantial registry with their respective magnets 66 and 68. In addition, such means is of such character as to additionally provide a guiding function so as to tend to cam the members 70 and 72 into such concurrent registry upon relative vertical movement of the magnets 66 and 68 toward the paramagnetic members 70 and 72. Such means comprises there being attached to the remote sides of the magnets 66 and 68 a pair of stop strips 90 and 92, such stop strips 90 and 92 being fixed to the remote sides of the magnets 66 and 68 and projecting downwardly below the magnets to which they are attached, and preferably, the extents of the stop strips 90 and 92 projecting below the magnets are downwardly and outwardly flared from each other as indicated at 94 in relation to the stop strip 92 shown in FIG. 8. In other words, the extents of the stop strips 90 and 92 projecting downwardly from the lowermost extents of the magnets 66 and 68 are downwardly divergent, the arrangement being such that the adjacent sides of the downwardly divergent portions of the stop strips jointly define guide means or cam means tending to direct the paramagnetic members 70 and 72 in a lateral direction such as to bring such members into registry with their respective magnets 66 and 68.

A short stop strip such as the one indicated at 96 in relation to the magnet 68 shown in FIG. 8 is attached to the rear end of each of the mangets 66 and 68, and such stop strips each project downwardly and rearwardly as indicated at 98 below the lowermost extent of the magnets. The stop strips 96 tend to prevent magnetic coupling between its magnet and the associated paramagnetic member when the latter is so rearwardly disposed as to engage against the lowermost edge of the stop strip. Additionally, the stop strip 96 limits rearward movement of the paramagnetic member when the latter is in sliding and magnetic coupled engagement to the magnet. Finally, the rearwardly and downwardly inclined lowermost edge portion of the stop strip 96 tends to cam a paramagnetic member into longitudinal registry with its respective magnet, as will be appreciated. If desired, stop strips can be provided not only at the rear ends but additionally at the front ends of the magnets if deemed necessary or expedient; however, such is not ordinarily preferred as this would impede decoupling the paramagnetic members from their magnets by the simple expedient of moving the members forwardly until they have separated from their respective magnets, it being noted that such mode of separation is quite convenient and does not involve directly opposing magnetic attractive forces, and the abrupt movement of the basket that almost certainly would occur upon having brought a sufficient downward pressure to effect decoupling the magnetically coupled elements.

It is preferred that all of the stop strips 90, 92 and 96 be of diamagnetic material so as not to partake of or otherwise materially affect the processes of magnetically coupling or breaking magnetic coupling of the members 70 and 72 with the magnets 66 and 68. For this purpose the stop strips can be of aluminum or of stainless steel alloys of such composition as to be substantially monmagnetic in character. As stated previously, the members 70 and 72 are of paramagnetic character, and for this purpose such members 70 and 72 can be of mild steel, the same preferably being plated with nickel metal. If desired or deemed expedient, the members 70 and 72 can be magnets themselves and not merely of paramagnetic material. For example, the members 70 and 72 can be permanent Alnico magnets with polarity arrangements such as to be attracted to their respective magnets 66 and 68. Indeed, when the members 70 and 72 are magnets, the magnets 66 and 68 can be replaced by paramagnetic material and need not be magnetized. Such as inverse arrangement of magnets and paramagnetic material will be readily understood to be the full equivalent of the structure thus far illustrated and described. Whatever the arrangement, it is preferred that the previously described stop strips be of diamagnetic or nonmagnetic material, and it will be appreciated that in lieu of or in addition to the illustrated and described stop strips, corresponding guide and stop means, also of diamagnetic material, can be affixed to the members 70 and 72.

As thus far described, it will be understood that when the basket 22 is disposed in the liner 26 (the latter being seated within the vessel 16), and the withdrawal member 60 is thereafter forced into the vessel 16, the magnets 66 and 68 will approach and eventually engage the members 70 and 72 respectively, whereupon the basket 22 is magnetically coupled to and will be suspended from the withdrawal member 60 to rise therewith on subsequent raising of the withdrawal member 60. For reasons subsequently to be explained, the angular position of the withdrawal member 60 about its central vertical axis remains fixed, and since the angular position of the basket 22 about its central axis is predetermined by the meshing engagement of the notch 50 therein with the vent pipe 46, it is assured that the magnets 66 and 68 are in parallelism and directly above the paramagnetic members 70 and 72 whenever the basket 22 is in the vessel 16. In any event, any slight misalignment will be corrected on approach of such elements due to the camming action of the stop strips 90 and 92. Indeed, even in the absence of the provision of the stop strips 90 and 92, alignment is sufficient for amply adequate magnetic coupling.

Figure 2:
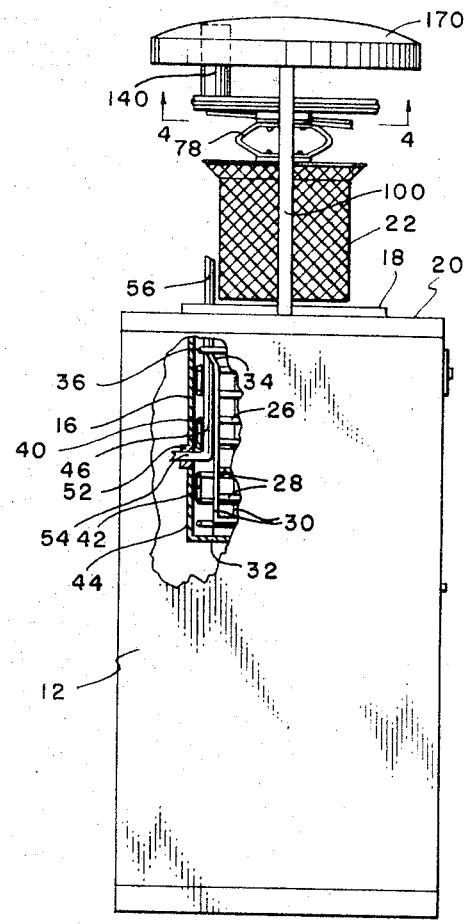
FIG. 2 is a side elevational view of the apparatus shown in FIG. 1, this view having a part of the cabinet broken away to show partially the contents of the cooking vessel and to illustrate in vertical section a part of the cooking vessel.
Figure 3:
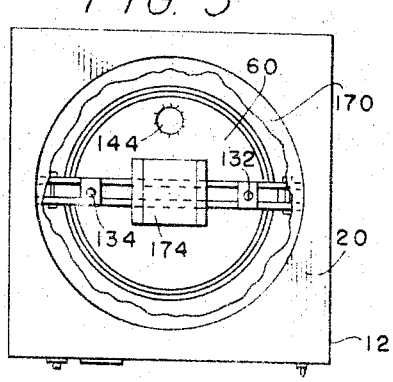
FIG. 3 is a top plan view of the apparatus shown in FIG. 1, this view having a part of the shield broken away to show structure upon which the shield is mounted, and the withdrawal member or closure including the vapor dome.

Power means is provided for forcibly lowering the withdrawal member 60 from the position shown thereof in FIGS. 1 and 2 to a position in which the withdrawal member 60 is in a position forced downwardly into the cylinder 16 sufficient to obtain a pistonlike action. Such means comprises a pair of upstanding parallel bars 100 and 102 that are mounted for vertical reciprocation through the top 20 of the cabinet 12. Portions of the bars 100 and 102 are formed as verically extending rack gears 104 and 106 that are in engagement with pinion gears 108 and 110 that are fixed to the opposite ends of a shaft 112 that is mounted for rotation about a horizontal axis in bearings 114 and 116 fixed in position in the cabinet 12. The shaft 112 can be forcibly rotated in either a forward or reverse direction from a reversible electric motor or prime mover 118 through a power train that includes reduction gearing 120 and meshed spur gears 122 and 124. As thus far described, rotation of the prime mover 118 in one direction will forcibly urge the bars 100 and 102 upwardly at uniform rates, and reversal of the rotation of the electric motor 118 will cause downward movement of the bars 100 and 102 at uniform rates.

The upper ends of the bars 100 and 102 are connected by a horizontal cross member 130 that is spaced above and passed directly over the center of the withdrawal member or pressure plate 60. Diametrically opposed positions inwardly spaced from the periphery of the withdrawal member 60 are fixedly secured to the cross member 130 by means of parallel and vertical struts 132 and 134, the upper and lower ends of the struts 132 and 134 being secured in any suitable manner to the cross member 130 and the withdrawal member 60, respectively. As previously indicated, this arrangement prevents rotation of the withdrawal member 60 about its central vertical axis, and additionally, the vertical spacing between the withdrawal member 60 and the cross member 130 permits the withdrawal member 60 to be forced downwardly into the vessel 16 without the cross member 130 coming into engagement with the top 20 of the cabinet 12.

In order to accommodate the upwardly projecting inlet end portion 56 of the vent pipe 46 and in order to effect a very efficient separation of entrained liquid droplets or mists from vapor to be vented from the vessel 16, the pressure plate or withdrawal member 60 is provided with an upstanding vapor dome 140 that is disposed in vertical alignment with the vapor vent pipe portion 56. The vapor dome 144 can conveniently be in the form of a hollow circular cylinder having a closed upper end 142, and a lower end fixedly and sealingly secured to the upper surface of the withdrawal member 60 as by welding 144.

An opening 146 extends vertically through the pressure plate or withdrawal member 60 in alignment with the vent pipe portion 56, and such opening 146 has a diameter at least sufficient to afford working clearance for the vent pipe portion 56 so that the latter can project upwardly into the vapor dome 140 when the withdrawal member 60 is forced downwardly. If desired, the opening 146 can have a diameter as great as that of the internal diameter of the vapor dome 140.

It will be appreciated that the opening 146 affords fluid communication between the interior of the vapor dome 140 and space below the withdrawal member or pressure plate 60, the arrangement being such that vapor entrapped within the vessel 16 below the pressure plate 60 is in communication with and may pass upwardly into the vapor dome 140, and therein have communication with the open upper end of the upper portion 56 of the vent pipe. Thus, even if the total quantity of vapor entrapped in the system (the term "system" being employed to include the volume that is confined by the vessel 16, the pressure plate 60, the opening 146 and the interior of the vapor dome 160) is so small that no vapor is present below the pressure plate 60, the inlet end of the vent pipe portion 56 is disposed adjacent the upper end 142 of the vapor dome 140 and thus in communication with such small amount of vapor as may be entrapped in the system.

It is considered an important feature of the invention insofar as preventing entrained liquid droplets and mists from gaining access to the upper vent pipe portion 56 that the internal diameter of the vapor dome 140 be substantially in excess of the external diameter of the upper vent pipe portion 56, this being beneficial in that the upward vertical velocity of vapor in the annular space between the vent pipe portion 56 and the vapor dome 140 is minimized. Such minimization of vertical vapor movement will allow according to Stokes law larger liquid droplets to descend countercurrent to vapor flow or at least proceed upwardly at a sufficiently low rate as to greatly increase the likelihood of collision of and coalescence of droplets so that they may acquire sufficient mass in relation to their diameter to pass downwardly about the pipe 56 through the opening 146 to return to the mass of liquid contained in the vessel 16. With this consideration in view, it may be desirable or even preferred that the diameter of the opening 146 be equal to the internal diameter of the vapor dome 140. Even with respect to smaller liquid droplets and mists, it will be appreciated that any diminution in upward vertical vapor velocity will increase the likelihood of coalescence and consequently enhance the tendency of entrained liquid to move countercurrent to the rising vapor stream.

Yet another provision is made in the present invention that is extremely effective to prevent or greatly reduce the amount of liquid carried by vapor by entrainment into the vapor dome 140, and this provision comprises baffle means in the form of a baffle plate 150 disposed below and carried by the pressure plate or withdrawal member 60. The baffle plate 150 has a forward edge 152 spaced a substantial interval from the cylindrical projection of the internal surface of the vessel 16, and an arcuate rear edge 154 that is relatively closely spaced to such cylindrical projection. The spacing of the arcuate edge 154 while being close is yet sufficient to allow some and not to entirely preclude the vertical flow of vapor between the edge 154 and the internal surface of the vessel 16 when the withdrawal member 60 is disposed within the vessel 16. The baffle plate 150 has opposite side edges 156 and 158 that are disposed inwardly of the adjacent sides of the magnets 66 and 68. A degree of clearance between the edges 156 and 158 from the magnets 66 and 68 is established which will allow a somewhat greater rate of vapor flow therebetween than about the edge 154, but less than that about the edge 152.

Figure 4:
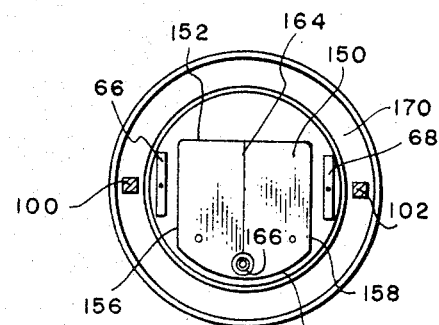
FIG. 4 is a horizontal sectional view taken upon the plane of and in the direction shown with respect to the section line 4—4 in FIG. 2, this view being taken with the basket being removed.

As clearly shown in FIGS. 5 and 6, the baffle plate 150 is throughout its extent vertically spaced below the under side of the withdrawal member 60, but with the vertical spacing being greater at the front edge 152 than at the rear edge 154. In other words, the baffle plate 150 is spaced below the withdrawal member 60 and has a generally downwardly inclined forward slope. The baffle plate 150 is supported from and fixed in such relationship to the withdrawal member 60 by means of fasteners 160 and spacers 162 visible in FIG. 5. Furthermore, it is preferred that the baffle plate 150 be of a slightly "V" configuration, with the apex 164 extending centrally of the baffle plate 150 in a forwardly and rearwardly direction as plainly shown in FIG. 4. The depth of the V is preferably progressively greater along the extent of the apex 164 from the rear edge 154 towards the front edge 152 of the baffle plate 150.

The baffle plate 150 is provided with an opening 166 therethrough that is just sufficiently large as to insure working clearance for the upper portion 56 of the vent pipe, it being understood that the opening 166 is for the purpose of accommodating the vent pipe 56 therethrough. The clearance afforded for the vent pipe 56 by the opening 166 is as small as practically possible so as to minimize the vertical flow of vapor therethrough.

The baffle means constituted of the baffle plate 150 is for the purpose of affording an extended or tortuous path of movement of vapor from therebelow to the vapor dome 140 so as to prevent direct vertical flow thereto, and to establish such a path and a collecting surface upon which entrained liquid droplets and mists may impinge and collect or coalesce for subsequent drainage along the inclined extent thereof back into the main mass of liquid contained within the vessel 16.

It has been found during actual tests of apparatus constructed according to the invention as herein disclosed that the provision of the baffle plate 150 reduces the amount of cooking oil or liquid lost during the venting of vapors from an appreciable amount such as to necessitate frequent replenishment of cooking oil within the vessel 16 after a few cooking cycles to such a relatively low amount that virtually all necessity for replenishment of cooking oil may be accounted for by the cooking oil removed therefrom with the cooked products. It has been found that the use of the baffle plate 150 has reduced the amount of cooking oil collected in a trap at the discharge end of the vent pipe from about a quart per day to a trace amount even after several days of cooking operations.

A domelike shield 170 having a concave undersurface 172 is disposed above the cross member 130 and the vapor dome 140, such shield 170 being rigidly attached centrally to the cross member 130 by a bracket 174. The diameter of the shield 170 is substantially in excess of the diameter of the pressure plate 60 and indeed is greater than the spacing of the opposite sides of the bars 100 and 102. The shield 170 is provided with a depending peripheral annular flange 176 which has a lower edge 178 positioned so as to be spaced slightly above the top 20 of the cabinet 12 when the pressure plate 60 is lowered into its cooking or operative position within the vessel 16.

The shield 170 contributes to a more pleasing overall appearance of the apparatus 10, and additionally serves the safety function of downwardly diverting any vapors or liquids which might escape from the vessel 16 about the pressure plate 60. Though such provision of the shield 170 for the safety function thereof is deemed marginal inasmuch as extensive and prolonged tests of the apparatus 10 have not resulted in any excape of vapor or liquid such as to require such precautionary structure, it will be evident that such provision nevertheless enhances the overall safety posture of the apparatus 10.

As previously set forth, the basket 22 is made of a material and has surfaces such as to present no health hazards upon use in conjunction with cooking operations, and it is, of course, equally true that all other materials and surfaces definitive of the variable volume, confined cooking zone that they also do not constitute any health hazard or impart objectionable tastes or coloration to the cooked products. Accordingly, the vessel 16 can in view of such necessities and desideratums be made of aluminum or stainless steel, the latter being preferred. The electrical heating elements can be such as are conventionally used to heat cooking oils in which such elements are immersed, and the liner 26 can be nickel plated steel rod or wire. The vent pipe 46 including the upper portion 56 thereof can be either stainless steel or nickel plated steel. The mounting brackets 74 and 76 are preferably nickel plated steel, and it is also preferred that the rods 86 of the limit means be either stainless steel or nickel plated steel. The elliptical springs 78 and 80 can be of stainless steel alloy possessing a sufficient degree of resiliency, or can be high carbon steels heat treated to possess physical characteristics similar to conventional clock springs, the latter being nickel plated.

The pressure plate or withdrawal member 60 can be either aluminum or stainless steel, and it is preferred that all fasteners (rivets, screws, spacers, and the like) exposed to the cooking zone be of stainless steel, or at least steel heavily nickel plated.

The use of the apparatus 10 will be readily understood. The vessel 16 is partially filled with a cooking oil or fluid having a boiling point substantially in excess of that of water, and such oil can be such as that conventionally used in deep-fat pressure cooking. The vessel will be filled to a level spaced below the top 18 of the vessel 16 sufficient to cover articles disposed in the basket 22 to be cooked when the basket 22 is disposed in its cooking position within the vessel 16. The apparatus 10 through the use of its controls is operated to energize the heating elements and to raise the temperature of the cooking oil to a desired cooking temperature. After the oil has reached the desired cooking temperature, the articles of food to be cooked can be immersed in the oil in either of three different ways. First, with the basket 22 decoupled from the pressure plate 60 and disposed in the vessel 16 (the pressure plate 60 being in the position shown thereof in FIGS. 1 and 2), the individual articles of food (as for example, cut pieces of chicken having breading or batter thereon if desired) are individually dropped into the basket 22 so as to be immersed and to effect a surface cooking action upon the exposed surfaces of the articles as to prevent their becoming stuck or adhering to each other, such individual tossing of the pieces of the articles to be cooked into the basket 22, the apparatus 10 is actuated to lower the pressure plate 22 into its closing position. Secondly, the basket 22 can be decoupled from the pressure plate 60, filled with the articles of food to be cooked, and such basket 22 with its contents lowered manually into the vessel 16, with the pressure plate 60 being thereafter lowered into its closing position. Third, the basket 22 can be filled and then magnetically coupled to the pressure plate 60 when the latter is in the position shown thereof in FIGS. 1 and 2, and the pressure plate 60 can then be lowered to its closing position which thereby immerses the articles of food and the basket in the cooking oil.

Whichever of the three methods outlined above for immersing the articles of food in the oil is employed, the pressure plate 60 is forced downwardly below the upper end 18 of the vessel 16 so as not only to close or confine the cooking zone but is forcibly urged still further downwardly to such an extent as to compress the fluid contents thereof, especially the vapor contents thereof so as to accelerate the rate at which the pressure within the cooking zone increases, it being well known in the art that customarily such pressure increase is accomplished by the vaporization of moisture content of the food being cooked or by forcing air into such cooking zone. Such acceleration in the rate of pressure increase is very important in that it minimizes the extent to which moisture must be vaporized from the food to achieve desired cooking pressure. Furthermore, such compression of the vapor space within the cooking zone results in a reduction of the vapor space within which the partial pressure of water vapor must be increased to achieve the desired cooking pressure. Clearly, a reduced total vapor space volume will even in the absence of the compression of air entrapped in such space result in it being necessary to vaporize a lesser quantity of water to achieve a desired predetermined cooking pressure.

Either during the period of cooking under pressure and certainly at the termination of the cooking period, it becomes necessary to reduce the pressure in the cooking zone to atmospheric pressure prior to the pressure plate 60 being raised sufficiently to open the vessel 16. Such reduction of pressure is accomplished by venting vapor from the system through the vent pipe 46 under to control of valve means not shown, and for reasons previously explained, the provision of the vapor dome 140 and the provision of the baffle means greatly reduces vapor vented from the system having entrained therewith cooking oil. When vapor is vented for the purpose of reducing the pressure within the cooking zone to atmospheric pressure, it is especially desirable that such venting be accomplished with considerable rapidity so that the cooked articles can be speedily withdrawn from immersion in the oil, this desirability being for the reason that the reduction of pressure will of course be conducive to vaporization of water from the cooked articles as well as being conducive to the desorption of and loss of gases adsorbed in the food. It is understood that it is particularly desirable to avoid desorption of oxygen from food such as chicken insofar as possible. The provision of the vapor dome and the baffle means enable much faster venting than could be otherwise obtained so that pressure may be reduced to atmospheric in a minimum period of time with the result that the food can be removed from the hot cooking oil as promptly as possible.

The provision of the stop strips 90, 92 and 96 is important when the third method of food immersion is employed for the reason that they tend to preclude manual coupling of the basket to the pressure plate 60 in misalignment with the liner 26 and in particular to preclude the notch 50 not being in proper alignment with the vent pipe portion 56.

Though the third method of food immersion may be preferred by some, the first and second methods are preferred by most it is believed, and it is therefore highly advantageous and well nigh imperative that the present invention includes means for automatically coupling the basket 22 to the pressure plate 60 after the basket 22 has already been seated within the cooking vessel 16. The magnetic coupling means illustrated and described serves admirably well the function of automatic coupling of the withdrawal member or pressure plate 60 to the basket 22 in response to the member or plate 60 being lowered with respect to the basket 22.

An outstanding advantage of the particular automatic coupling means described and disclosed herein resides in the fact that the spring means will yield to downward movement of the pressure plate 60 after magnetic coupling has been achieved, and this enables dimensioning of the apparatus that will positively insure the coacting magnetic elements being brought into contact with each other, and yet avoid the consequence of any destructive forces being developed upon further downward movement of the plate 60 after magnetic coupling has been achieved. Such yielding is also of importance in the possible though unlikely event of some foreign object becoming lodged between the vessel 16 and the underside of the basket 22.

Obviously, other means could be provided than the magnetic means illustrated and described for automatically coupling the basket 22 to the withdrawal member 60 in response to lowering of the latter; however, the magnetic means are preferred inasmuch as the same does not require relatively movable latch members and the like. The only moving parts employed in the couling means of the present invention involving the spring means, the latter being desirable without regard to the specific character of the coupling employed so as to afford a force or pressure relief.

The illustrated and described preferred embodiment of the invention is of course subject to numerous variations and modifications without departing from the spirit of the invention, as for example, the provision of a mechanical latching structure in lieu of the mechanical coupling structure, and accordingly, attention is directed to the appended claims in order to ascertain the actual scope of the invention.

I claim:

1. In apparatus for immersion treatment of articles, structure comprising an upright, open-topped container adapted to contain a liquid, perforate article carrying means removably received within said container whereby articles carried by said means can be immersed within the container, combined means for closing the container and for withdrawing said article carrying means from the container comprising a piston-like closure member mounted for vertical movement relative to the container along a path above the article carrying means, said closure member being slidably and sealingly received within said container along the lower portion of its path of movement, said article carrying means and the closure member being provided with coacting means responsive to downward closing movement of the closure member to a predetermined position relative to the article carrying means to detachably secure said closure member to the article carrying means whereby the latter means can be supported and raised from within the container on upward and container opening movement of the closure member whereby the article carrying means can be removed from the container.

2. In apparatus for immersion treatment of articles, structure comprising an upright, open-topped container adapted to contain a liquid, perforate article carrying means removably received within said container whereby articles carried by said means can be immersed within the container, means for withdrawing said article carrying means from the container comprising a withdrawal member mounted for vertical movement relative to the container along a path above the article carrying mans, said article carrying means and the withdrawal closure member being provided with magnetic coacting means responsive to downward closing movement of the withdrawal member to a predetermined position relative to the article carrying means to detachably secure the withdrawal member to the article carrying means whereby the latter means can be supported and raised from within the container on upward movement of the withdrawal member, and means for raising the withdrawal member whereby the article carrying means can be removed from the container.

3. In apparatus for immersion treatment of articles, structure comprising an upright, open-topped container adapted to contain a liquid, perforate article carrying means removably received within said container whereby articles carried by said means can be immersed within the container, means for withdrawing said article carrying means from the container comprising a withdrawal member mounted for vertical movement relative to the container along a path above the article carrying means, said article carrying means and the withdrawal member being provided with coacting means responsive to downward closing movement of the withdrawal member to a predetermined position relative to the article carrying means to detachably secure the withdrawal member to the article carrying means whereby the latter means can be supported and raised from within the container on upward movement of the withdrawal member, and means for raising the withdrawal member whereby the article carrying means can be removed from the container, said coacting means including spring means for resiliently yielding vertically to such forces imposed thereon by downward closing movement of the withdrawal member relative to the article carrying means in excess of a predetermined amount.

4. In apparatus for immersion treatment of articles, structure comprising an upright, open-topped container adapted to contain a liquid, perforate article carrying means removably received within said container whereby articles carried by said means can be immersed within the container, means for withdrawing said article carrying means from the container comprising a withdrawal member mounted for vertical movement relative to the container along a path above the article carrying means, said article carrying means and the withdrawal member being provided with coacting means responsive to downward closing movement of the withdrawal member to a predetermined position relative to the article carrying means to detachably secure the withdrawal member to the article carrying means whereby the latter means can be supported and raised from within the container on upward movement of the withdrawal member, and means for raising the withdrawal member whereby the article carrying means can be removed from the container, said coacting means comprising a magnet and a spring means for yielding to such forces imposed thereon by downward closing movement of the withdrawal member relative to the article carrying means in excess of a predetermined amount.

5. The combination of claim 4, wherein said spring means is of a loop configuration to constitute a handle by means of which the article carrying means can be manually lowered into the container.

6. In apparatus for immersion treatment of articles, structure comprising an upright, open-topped container adapted to contain a liquid, perforate article carrying means removably received within said container whereby articles carried by said means can be immersed within the container, means for withdrawing said article carrying means from the container comprising a withdrawal member mounted for vertical movement relative to the container along a path above the article carrying means, said article carrying means and the withdrawal member being provided with coacting means responsive to downward closing movement of the withdrawal member to a predetermined position relative to the article carrying means to detachably secure the withdrawal member to the article carrying means whereby the latter means can be supported and raised from within the container on upward movement of the withdrawal member, and means for raising the withdrawal member whereby the article carrying means can be removed from the container, said container including an upper portion that has a vertically extending cylindrical inner surface, said withdrawal member having a peripheral configuration in vertical projection that is complementary to and which is slidably and sealingly engageable with said inner surface to constitute a closure piston for the container whereby any vapor within the container prior to lowering movement may be compressed below the piston to increase pressure prevailing in the container, and wherein said means for raising the withdrawal member is actuable to lower the withdrawal member.

7. The combination of claim 6, including an upstanding vapor vent pipe in the container, said pipe having a lower end sealingly communicating with the exterior of the container, said pipe having an open upper end portion to accommodate entry of vapors to be vented, and said withdrawal member having a vapor dome in vertical alignment with the upper end portion of the vent pipe, said dome receiving the upper end portion of the vent pipe therein when the withdrawal member is moved down to said predetermined position, the arrangement being such that a relatively high vapor compression ratio can be obtained in relation to the extent of the spacing of the upper end of the vent above liquid in the container.

8. The combination of claim 7, including baffle means below and carried by the withdrawal member defining a tortuous vapor path from below such means to the vapor dome, whereby liquid entrained by vapor largely collects on and may drain from such baffle means.

9. The combination of claim 8, wherein said baffle means comprises a baffle plate spaced below the withdrawal member, said plate having an opening therethrough in alignment with the vent pipe, said opening having dimensions such as to afford clearance for the vent pipe, and said vapor dome having dimensions for accommodating the vent pipe greater than those of the opening in the baffle plate.

10. The combination of claim 9, wherein the baffle plate is inclined downwardly from the opening therethrough in a direction toward the greatest spacing of the vapor dome from the periphery of the withdrawal member, said plate having free edges spaced below the withdrawal member and also spaced inwardly of the periphery of the latter.

11. The combination of claim 2, wherein said magnetic means comprises a pair of spaced elongated magnets carried by the withdrawal member, and a pair of correspondingly spaced elongated paramagnetic members, said paramagnetic members being mounted on the top of a pair of elliptical leaf springs fixed at diametrically opposed positions at the top of said article carrying means, and means for limiting upward movement of the paramagnetic members relative to the article carrying means.

12. The combination of claim 11, including guide means for guiding the magnets and paramagnetic members into concurrent registry and magnetic coupling, and said spring means being biased against said means for limiting movement.

13. The combination of claim 7, wherein said container has an annular portion, a chield for the top of the container fixed to and overlying the withdrawal member and the vapor dome, and said shield having a greater diameter than the withdrawal member and including a depending peripheral marginal portion.

14. In the combination of a vessel having a vertically movable closure therefor, and a basket dependingly supported by the closure in an arrangement such that the basket and its contents can be immersed in and removed from a liquid in the vessel on appropriate movement of the closure, the improvement comprising coacting magnetic means carried by the closure and the basket releasably connecting the closure and the basket.

15. The combination of claim 14, wherein said coacting magnetic means includes separable portions mounted on the basket and the closure, such portions being magnetically attracted to each other in a vertical direction, said portions having engageable mating surfaces with said surfaces being in sliding engagement in a horizontal direction, whereby said magnetic attraction and the magnetic coupling of the two portions can be broken by moving one of the portions horizontally relative to the other.

16. The combination of claim 14, wherein said coacting magnetic means include separable portions mounted on the basket and the closure, such portions being magnetically attracted to each other in a vertical direction, and one of said portions being mounted by vertically yieldable spring means, whereby substantial avoidance is obtained of any destructive forces which might otherwise be developed on closing the closure in the event a foreign object gains entry to the vessel below the basket.

17. In the combination of a vessel adapted to contain a liquid with vapor space thereabove and a vertically movable closure for the vessel that is movable between positions that open and close the vessel, said vessel having a vapor vent pipe fixedly secured thereto for venting vapor from the vessel, the improvement therein comprising said closure having an upstanding vapor dome mounted thereon for movement therewith that is of horizontal internal dimensions substantially less than those of the vessel, and said vent pipe having an inlet end portion that is upstanding and which is received within the dome when the closure closes the vessel.

18. The combination of claim 17, wherein said closure is of the piston type and is sealingly slidable in the vessel, whereby to lessen the vertical height of the vapor space and to compress vapor contained therein, and whereby the inlet of the vent pipe can be disposed substantially above a liquid therein to minimize any liquid droplets being entrained thereinto despite reduction of vertical height of the vapor space entailed in realizing a vapor compression ratio sufficient to elevate pressure within the vessel.

19. The combination of claim 17, including baffle means below and carried by the closure defining a tortuous vapor path from below such means to the vapor dome, whereby liquid entrained by vapor largely collects on and may drain from such baffle means.

20. The combination of claim 17, including a basket vertically movable into and out of said vessel, and magnetic means for removably supporting the basket from the closure for movement therewith.

21. In apparatus for the pressure cooking of foods of the type wherein a food carrying basket is suspended from a vertically movable closure for movement into and out of a cooking vessel on the closure being moved to its vessel closing position and raised open position, respectively, the improvement comprising said basket being suspended from said closure by means of a vertically yieldable spring means, whereby forcible closure of the vessel does not result in destructive forces upon a foreign object becoming interposed between the basket and the bottom of the vessel.

22. In apparatus for the deep-fat pressure cooking of food which includes container means definitive of a confined cooking zone in which food having a moisture content may be contacted with heated cooking oil; the improvement comprising said container means being definitive of a confined cooking zone of variable volume and which is actuable to vary said volume, and power means disposed externally of the container means and operatively connected to the container means for selectively actuating the latter to increase and to reduce the volume of the confined zone, whereby the contents of such zone can selectively be compressed to increase the pressure of such contents.

* * * * *